United States Patent [19]
Frederick

[11] Patent Number: 6,098,447
[45] Date of Patent: Aug. 8, 2000

[54] DYNAMIC FORCE MEASURING INSTRUMENT FOR FOUNDATION AND CASING

[75] Inventor: Leonard L. Frederick, Whippany, N.J.

[73] Assignee: Frederick Engineering Co., Whippany, N.J.

[21] Appl. No.: 09/173,733

[22] Filed: Oct. 16, 1998

[51] Int. Cl.$^7$ .................................................. G01N 19/02
[52] U.S. Cl. ............................ 73/12.06; 73/85; 73/11.03
[58] Field of Search .................. 73/11.03, 84, 85, 73/12.01, 12.06

[56] References Cited

U.S. PATENT DOCUMENTS

| | | | |
|---|---|---|---|
| 3,817,091 | 6/1974 | Frederick | 73/84 |
| 3,931,729 | 1/1976 | Frederick | 73/11.03 |
| 4,112,733 | 9/1978 | Marchetti | 73/11.03 |

*Primary Examiner*—Max Noori
*Attorney, Agent, or Firm*—Ronald E. Greigg; Edwin E. Greigg

[57] ABSTRACT

An attenuation circuit for a pile driving force measurement device is disclosed. The attenuation circuit allows for measurements to be made of the force being applied to a driven pile at a reduced voltage compatible with a voltage sensitive measurement device, such as a personal computer. The forces measured create measurable electrical impulses via magnetostriction. The attenuation circuit conditions the measured impulses so that no separate electrical power circuit or battery is required to power the sensor. At the same time the attenuation circuit protects the measurement device from voltages which might be overly high and damage the equipment.

9 Claims, 2 Drawing Sheets

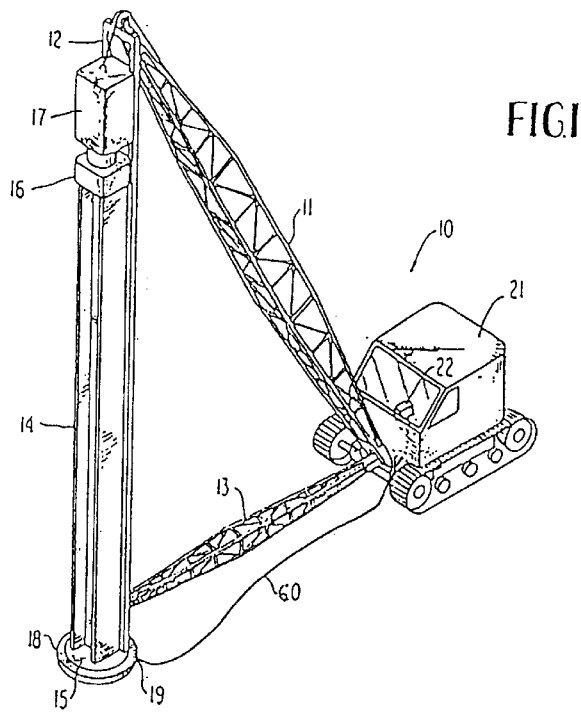
FIG.1
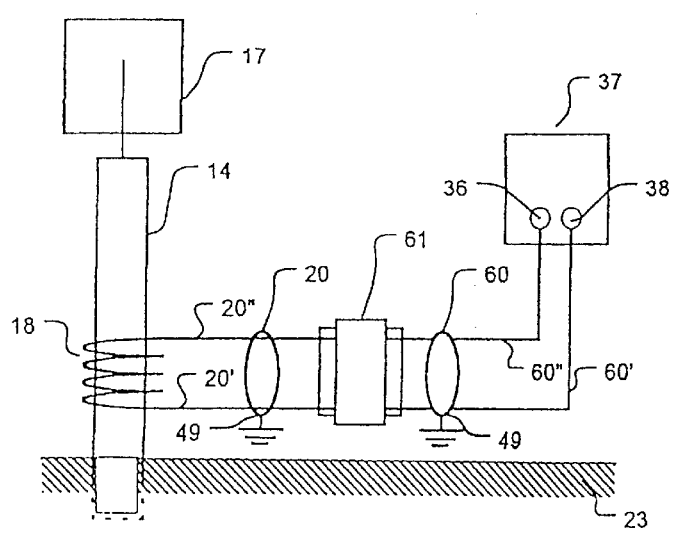
FIG. 5
FIG. 6

DYNAMIC FORCE MEASURING INSTRUMENT FOR FOUNDATION AND CASING

FIELD OF THE INVENTION

This application is for an improvement over U.S. Pat. No. 3,931,729, entitled DYNAMIC FORCE MEASURING INSTRUMENT FOR FOUNDATION AND CASING, issued to LEONARD L. FREDERICK, on Jan. 13, 1976. The improvement allows for the acquisition of data, such as depth driven and force applied, from the driven pile with simpler electric circuitry and without the use of a separate battery or other power circuit as was required by the patented invention.

BACKGROUND OF THE INVENTION

As a pile is driven, the operator of the pile driver must be careful to control the force of the blows applied to the pile so as not to exceed the elastic limit of the pile material in order to minimize costly tip damage. Those who are familiar with pile driving are well acquainted with the condition known in the art as "overdriving" and the ultimate damage that results therefrom. To minimize such damage, drive caps are fitted over the head of the pile to evenly transmit the hammer blows to the pile, while at the same time maintaining the head of the pile in alignment with the hammer by guiding the head parallel to the leads frame and retaining the pile in a straight predetermined path.

Though this helps to mitigate some of the damage, the burden in most cases falls largely upon the experience of the operator to determine the driving force required. For a given set of conditions, tests may be made to help the judgment of the operator and further strain gauges may be used to determine the force of the blow and the dynamic forces within the pile. Strain gauges, however, must be cemented or otherwise attached to the beam, and it is a relatively time consuming and costly process to mount them properly. The strain gauge is also a very fragile device and its reliability under the repetitive dynamic shock loading to which the pile is subjected is, to say the least, questionable.

After a pile is driven to the proper depth, there remains a need for measurement of the static bearing load which the pile will support, which is usually done by loading a test pile with weight until it moves. This is called a dead load bearing test and is also a time-consuming and expensive process. By accurate measurement of the dynamic forces below which the pile will not move, the bearing capacity may be reasonably estimated thus saving considerable time and expenses.

The patented invention disclosed both a novel apparatus and a novel method for utilizing magnetostrictive principles for accurately and quickly determining the driving force applied to the end of the pile, the visual indication of which can be displayed directly to the operator of the pile driver for proper adjustment and accurate control of the driving force. The principles of this invention can be further used to provide a means for determining the equivalent static bearing capacity of the pile after it is driven to a position where it should have attained its bearing capacity. In this application, those principles have been carried further in a simple, novel way to achieve data readouts to a computer or other instrument without the complexity of a separate power circuit.

Magnetostriction can be described as the deformation of a material causing the generation of an electric current which influences a magnetic field, or vice versa, i.e., deforming a ferrous material under the influence of the magnetic field and inducing a current, which accordingly changes the magnetic field. Further, the change in the magnetic field is proportional to the deformation within the elastic limit, thus such deformation may be determined by the magnitude of the change. Normally, this effect is small and noticeable under most conditions, however, the tremendous driving force used in driving a pile gives rise to usable signals which can be sensed with instruments of normal sensitivity and be used to determine the force with which the pile was struck. Some explanation of the terms and properties used in this application would be useful at this point.

MAGNETOSTRICTION: This term defines the effect whereby a material will change shape in the presence of an external magnetic field. This effect is brought about by the re-ordering of the magnetic dipoles within the material. The British physicist, J. P. Joule, discovered this effect in 1847. Joule later discovered the VILLARI EFFECT in 1864.

VILLARI EFFECT: This term defines what happens when one applies an external stress to a magnetostrictive material, such as iron; thus, a corresponding strain will develop, which strain will in turn induce a magnetic field. This application capitalizes upon this Villari effect.

OBJECTS OF THE INVENTION

Accordingly, it is the principal object of the invention to provide a novel circuit for a force-measuring transducer that does not require a separate power circuit in order to allow for the measurement of the force data from the hammer that is applied to the pile with extreme accuracy, which data readout will allow an operator to prevent damage to the tip of the pile.

It is also an object of this invention to provide a transducer having simplified electric circuitry versus the state of the art and yet that will still accurately measure the maximum threshold force from the pile driving hammer that can be applied to the pile without causing permanent penetration of the pile into the ground. Thus, the maximum bearing capacity of the pile can be determined immediately and thus eliminates the need for a costly dead load bearing test.

A still further object of this invention is to provide an attentuation circuit that improves pile bearing measurement techniques and that reduces the required coil voltage so that the output of the circuit is compatible with a computer or an oscilloscope.

SUMMARY AND ADVANTAGES OF THE INVENTION

The invention comprehends the use of a passive sensor and attenuator equalizer to provide electrical isolation between the sensor and cable. The magnetic flux sensor is a passive coil placed over the pile and does not require physical contact to the pile for measurement.

No electrical stimulus to measurement sensors or the pile being measured is required. It is not necessary to generate a magnetic field to measure the field produced in the pile by the impact of the hammer. By virtue of "inverse magnetostriction", the strain in the pile produced by the compression force of the hammer produces a magnetic field that is proportional to the resistance that the pile encounters during driving.

The attenuator/equalizer provides a simple means of scaling the signal voltage for compatibility with the recording device, i.e., oscilloscope, computer monitor, chart recorder, etc. The attenuator/equalizer can be composed of any combination of elements, passive or active circuits, suitable for equalization of the signal and cable properties. The attenuator/equalizer provides a means for impedance matching, equalization, and termination of the sensor coil, cable, and measurement instrument.

Further objects and advantages will become more apparent from a reading of the following specification taken in conjunction with the drawings.

BRIEF DESCRIPTION OF THE DRAWINGS

FIG. 1 shows a perspective view of a mobile pile driver mounted on a crane with the relative positions of the transducer and readout units;

FIG. 5 shows a schematic view of a single coil, attenuator and oscilloscope or computer layout;

FIG. 6 shows a schematic view of the attenuator transformerless readout system;

FIG. 7 illustrates a mobile pile driving crane with which the present invention can be used.

DESCRIPTION OF THE PREFERRED EMBODIMENT

Figure 2:
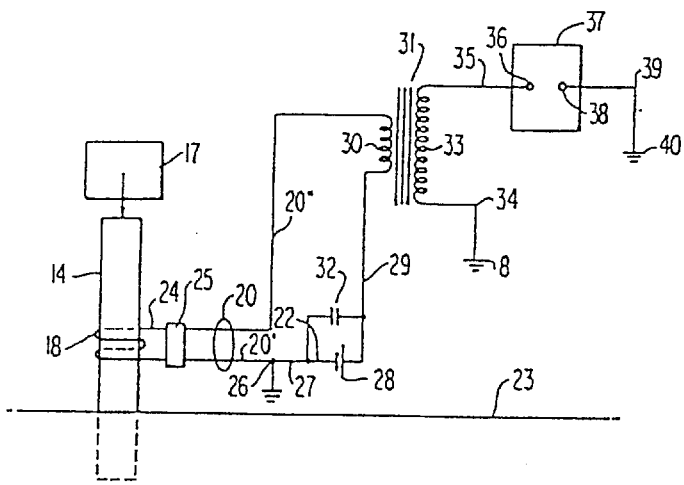
FIG. 2 shows a schematic view of the transducer and readout system using an impedance matching transformer.

Turning now to FIG. 1, there is shown a view of the customary mobile pile driving crane 10 on which is mounted a boom II, which is so mounted as to swivel at its upper end by hammer leads 12, and at its lower end by a bottom brace 13. For a better understanding of the function of the bottom brace, reference is made at this time to my U.S. Pat. No. 3,817,091 granted Jun. 18, 1974. The pile 14, which is shown in position preparatory to be driven into the earth, is supported at its lower end by the ground at the point generally denoted as 15, and at its upper end by the drive cap 16 which is slidably associated with the leads 12 so that the cap maintains the pile 14 in alignment with the leads at all times, the drive cap arranged to slide down as the pile is driven into the ground. Supported adjacent to the top of the leads and above the drive cap is a pile driving hammer 17, which is slidably associated with the leads and thereby arranged to follow the drive cap 16 and pile 14 as the pile is driven into the ground as indicated. Loosely fitted adjacent to the bottom of pile 14 without any physical or direct contact 25 there is the transducer 18. Electrically connected to the transducer 18, as generally shown at 19, is a cable 60 which may lie on the ground or be arranged to be carried along the longitudinal extent of the bottom brace 13 and into the cab 21 where it is attached to the visual readout unit 22 positioned in front of the operator so that he can maintain a constant surveillance of the progress of the pile while he controls the operation of the pile driver hammer 17.

Applicant believes that it should be apparent that since the transducer is positioned substantially at ground level, it is easily situated prior to erecting the pile into place, but must be lifted up over the top of the pile after the driving operation is completed and therefore the cable 60 should be sufficiently long enough to accomplish this purpose or the cable must be provided with some type of disconnect means, not shown.

Referring now to FIG. 2, there is shown a pile 14 which has been partially driven into the earth 23 by means of the pile driving hammer 17 shown supported above it. Loosely wound around pile 14 is the transducer 18, which comprises a single conductor 24, both ends of which terminate in a connector means 25. Extending from the connector means 25 and electrically connected to the transducer 18 is a pair of conductor cables 20 with one wire 20' being connected to ground at point 26. Also connected to ground at point 26 by a wire 22 is the negative terminal of battery 28 with the positive terminal connected by wire 29 to one end of the primary winding 30 of impedance matching transformer 31. Connected in parallel with battery 28 is capacitor 32, one end being connected to the negative terminal and the other end connected to the positive terminal, so that AC signals bypass the battery. The second wire 20" of cable 20 is connected from the connector means 25 to the other end of primary winding 30 of impedance matching transformer 31.

One end of the secondary winding 33 of impedance matching transformer 30 is connected to ground as at 34, the other end connected by wire 35 to the input terminal 36 of oscilloscope 37. The second terminal 38 of oscilloscope 37 is connected by wire 39 to ground as at 40.

It will be clear to those skilled in the art that a signal is induced into the transducer 18 by the magnetic field produced in the steel pile when it is struck and that this signal bypasses the battery through the capacitor 32 and is then amplified by the transformer action in the impedance matching transformer 31 to a usable voltage level to drive the oscilloscope 37. The signal level is proportional to the force with which the pile is struck and therefore the amplitude of the signal displayed on the oscilloscope is also proportional to the force. The battery 28 is used to establish a magnetic field level in the pile which changes when the pile is struck, but does not affect the actual signal that is induced into the transducer 18.

It should also be apparent to those skilled in the art that the signal level induced into the transducer 18 is also governed by the number of turns and the gauge of the wire, and the same principles apply as when designing transformers, i.e. for high frequencies, a generally low impedance winding is required, whereas the input to the oscilloscope requires a high impedance to prevent loading.

Other methods of isolating the energizing voltage of the transducer 18 from the oscilloscope can be used.

Figure 3:
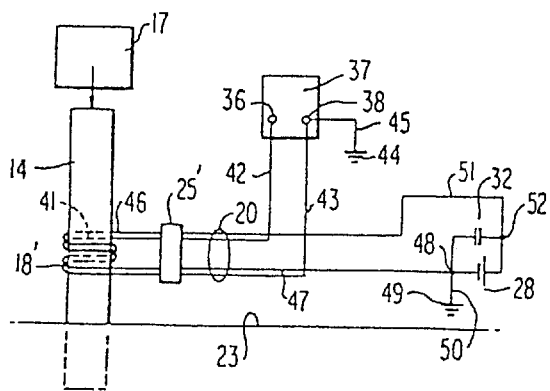
FIG. 3 shows a schematic view of the transducer utilizing bifilar windings and a transformerless readout system.

Referring now to FIG. 3, there is also shown a transducer 18' as a bifilar winding and in which a pair of insulated conductors 41–46 are wound into a coil and the four ends terminate in a connector 25'. Electrically connected to conductor 41 of transducer 18' at connector 25' is wire 42, which in turn is connected at its opposite end to the input terminal 36 of the oscilloscope 37. Electrically connected to the other end of winding 41 of transducer 18' at connector 25' is a wire 43 which is connected at its opposite end to the grounding terminal 38 of oscilloscope 37 with this terminal also being grounded as at 44 by wire 45. The second conductor 46 is electrically connected at one end at connector 25' then to wire 47 which is in turn connected at its opposite end to the negative terminal 48 the energizing battery 28. This negative terminal is also grounded as at 49 by a wire 50. Electrically connected to the other end of the conductor 46 at connector 25' is the wire 51, which is connected at its opposite end to the positive terminal 52 of the battery 28. Connected in parallel with battery 28 and extending across its terminals 48 and 52 is a bypass capacitor 32 which serves as previously stated to bypass the induced high frequency signal past the battery in a manner well known to the art.

It will be apparent to those skilled in the art that this construction isolates the oscilloscope circuit from the battery circuit, while the intimacy of the two conductors of the bifilar-wound transducer 18 closely couples the sensing winding 41 into the magnetic field produced by the energizing winding 46. Other components of the system, which are shown but not presently described, function in the manner previously described.

Figure 4:
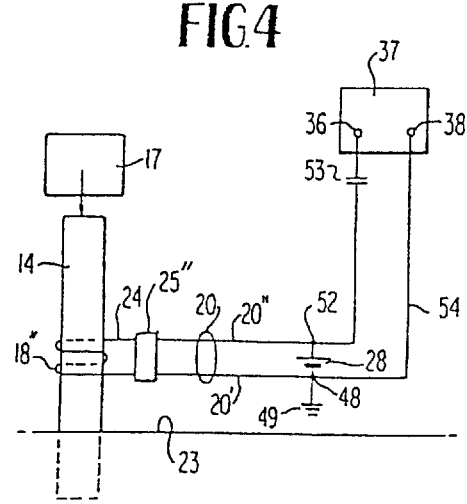
FIG. 4 shows a schematic view of the transducer utilizing a single winding and a capacitive coupled transformerless readout system.

A further method of isolating the energizing voltage of transducer 18" from the oscilloscope by use of a blocking capacitor is shown in FIG. 4, wherein the transducer 18" is wound with a single conductor 24, its ends terminating at connector 25 as clearly described in connection with FIG. 2. Electrically connected to one end of the winding conductor 24 at connector 25" is one conductor 20' of cable 20 which is connected to the negative terminal 48 of battery 28 and also grounded as at 49, as hereinbefore described.

Conductor 20" of the cable 20 is electrically connected at connector 25 to the other end of the transducer conductor 24 and connects to the positive terminal 52 of the battery 28, thus the transducer 18" is energized by battery 28 as explained earlier herein. Connected to positive terminal 52 of the battery 28 is a blocking capacitor 53 which is connected at its other end to the input terminal 36 of oscilloscope 37, and a lead 54 is arranged to be connected from the negative terminal 48 of battery 28 to the ground terminal 38 of the oscilloscope 37. It is believed to be clear from the foregoing that the battery voltage is effectively isolated from the oscilloscope and, further that the blocking capacitor 53 must have a low impedance at the signal frequency produced by the hammer blow, thus allowing the magnetostrictive signal to be passed into the oscilloscope.

Turning now to FIG. 5, there is shown a pile 14 which has been partially driven into the earth 23 by means of the pile driving hammer 17 shown supported above it. Loosely wound around pile 14 is the transducer, which comprises a single conductor both ends of which terminate to a shielded conductor 20, to form conductors 20' and 20". The shield is grounded at 49. The conductors 20' and 20" terminate in female connector 58. The male end 59 of attenuator plug 61 sockets into female connector 58, as shown in FIG. 6. The attenuator 61 is comprised of inline resistor 57 for line 20' and resistor 55 for line 20". Across terminals 64 and 65 is placed crossline resistor 56. The conductors 20' and 20" are then terminated in the female end of the attenuator plug 61 at 62. Male connector 63 which terminates shielded cable 60 sockets into female 62. As indicated in FIG. 5, shielded cable 60 containing wires 60' and 60" run to a computer or an oscilloscope 37, and are terminated at 36 and 38. Cable 60 shield is grounded at 49.

One skilled in the art should immediately grasp the importance of the improvements described herein upon U.S. Pat. No. 3,931,729. To ensure that those improvements are fully understood, applicant would advance the following features of this invention as being novel and non-obvious:

1. A simple electric circuit as described in FIGS. 5 and 6. This circuit functions better than that shown in the prior art, denoted by FIGS. 2, 3, and 4 of U.S. Pat No. 3,931,729, which figures of drawings are re-disclosed hereinabove.

2. A circuit that does not use a power source or battery.

3. A circuit that utilizes the advantages of an attenuator to make the voltage compatible to reading by a computer or an oscilloscope.

The improvements in the operation of the dynamic force measurement instrument over those provided by the applicant's above noted patent are numerous. Those improvements result from the benefits of the above-described attenuator circuit. The benefits provided by the attenuator/ equalizer and the removal of the battery circuit and the secondary coil circuit are as follows:

(1) The passive sensor and attenuator/equalizer provide electrical isolation between the sensor and cable. The magnetic flux sensor is a passive coil placed over the pile and does not require physical contact with the pile for measurement. No electrical stimulus to measurement sensors or the pile being measured is required. The elimination of the battery circuit and secondary coil that was used to produce a constant magnetic field resulted in a more consistent and clear measurement of the field produced by the pile hammer stress induced "inverse magnetostriction".

(2) Applicant has discovered that it is not necessary to generate a magnetic field to measure the field produced in the pile by the impact of the hammer. By virtue of "inverse magnetostriction", the strain in the pile produced by the compression force of the hammer produces a magnetic field that is proportional to the resistance that the pile encounters during driving.

(3) The attenuator/equalizer provides a simple means of scaling the signal voltage for compatibility with the recording device, whether it is an oscilloscope, a computer monitor, a chart recorder, or a similar measurement device.

(4) The attenuator/equalizer, which can be composed of any combination of elements, passive or active circuits, is suitable for equalization of the signal and cable properties.

(5) The attenuator/equalizer provides a means for impedance matching, equalization, and termination of the sensor coil, cable, and measurement instrument.

FIG. 7 illustrates a mobile pile driving crane with which the invention can be carried out.

I claim:

1. In a pile driving apparatus including a hammer for driving a pile formed at least in part of magnetostrictive material, having first means positioned in close proximity to said pile, proximate said magnetostrictive material, said first means supported independently of said pile and spaced therefrom for sensing magnetostrictive effect in said pile as a measure of a force of longitudinal blows applied to a top of said pile; and further having second means coupled to said sensing means for receiving a signal therefrom and for indicating the force of said blows to said pile, the improvement comprising third means adapted to eliminate a separate power circuit or battery for said first means.

2. In a pile driving apparatus as claimed in claim 1, said first means comprises a magnetic flux sensor having a sensor coil.

3. In a pile driving apparatus as claimed in claim 2, said third means allows an output voltage of said second means to be scaled for input to a voltage sensitive measurement device.

4. In a pile driving apparatus as claimed in claim 3, said voltage sensitive measurement device is selected from the group consisting of a computer, a chart recorder, or an oscilloscope.

5. In a pile driving apparatus as claimed in claim 1, said second means includes an attenuator/equalizer.

6. In a pile driving apparatus as claimed in claim 1, said third means comprises an attenuation circuit.

7. In a pile driving apparatus as claimed in claim 3, said first means and said third means provide electrical isolation between said first means and a cable connected to said voltage sensitive measurement means.

8. In a pile driving apparatus as claimed in claim 7, said third means provides impedance matching, equalization and termination of said sensor coil, said cable and said voltage sensitive measurement device.

9. In a pile driving apparatus as claimed in claim 1, said first means comprises a transducer, said second means comprises a shielded conductor including first and second conductor lines, said shielded conductor connected to said transducer and said conductor lines terminate in a first female connector, said third means comprises an attenuator having a first male connector on one end for attachment to said first female connector and a second male connector on an opposite end for attachment to a second female connector, said attenuator means further comprising a first inline resistor placed in said first conductor line, a second inline resistor placed in said second conductor line and a third crossline resistor and mounted upstream of said first and second resistors disposed between said conductor lines and connected to respective terminals provided in said conductor lines, all of said resistors being disposed between said first male connector and said second female connector, and said second female connector is attached to wire means leading to a voltage sensitive measurement device.

* * * * *